(12) United States Patent
Schrattenecker

(10) Patent No.: US 10,172,288 B2
(45) Date of Patent: Jan. 8, 2019

(54) HARVESTING ATTACHMENT FOR A HARVESTER

(75) Inventor: Franz Schrattenecker, Eggerding (AT)

(73) Assignees: CNH Industrial Belgium nv, Zedelgem (BE); BISO Schrattenecker GmbH, Ort im Innkreis (AT)

( * ) Notice: Subject to any disclaimer, the term of this patent is extended or adjusted under 35 U.S.C. 154(b) by 123 days.

(21) Appl. No.: 13/979,490

(22) PCT Filed: Jan. 13, 2012

(86) PCT No.: PCT/EP2012/050519
§ 371 (c)(1),
(2), (4) Date: May 13, 2014

(87) PCT Pub. No.: WO2012/098061
PCT Pub. Date: Jul. 26, 2012

(65) Prior Publication Data
US 2014/0325948 A1    Nov. 6, 2014

(30) Foreign Application Priority Data
Jan. 17, 2011 (DE) .................. 10 2011 008 723

(51) Int. Cl.
*A01D 75/00* (2006.01)
*A01D 41/14* (2006.01)
*A01D 45/02* (2006.01)

(52) U.S. Cl.
CPC .......... *A01D 75/00* (2013.01); *A01D 41/147* (2013.01); *A01D 45/021* (2013.01)

(58) Field of Classification Search
CPC .............. A01D 41/06; A01D 41/14; A01D 41/141–41/148; A01D 45/021; A01D 25/00–25/048; A01D 75/00; A01D 67/00–67/04; A01B 33/02; Y10T 403/7094

See application file for complete search history.

(56) References Cited

U.S. PATENT DOCUMENTS

| 3,201,928 A | * | 8/1965 | Claas ........................ 56/98 |
| 3,228,178 A | * | 1/1966 | Shonkwiler ......... A01D 41/14 56/214 |
| 3,294,133 A | * | 12/1966 | Claas ............... A01D 41/14 241/247 |
| 3,363,407 A | * | 1/1968 | Drummond ......... A01D 34/04 56/14.4 |

(Continued)

FOREIGN PATENT DOCUMENTS

| CN | 2305042 Y | 1/1999 |
| CN | 201084931 Y | 7/2008 |

(Continued)

OTHER PUBLICATIONS

Rick Weber, Jul. 1, 2003, http://trailer-bodybuilders.com/fabrication/how-deal-dissimilar-metals.*

*Primary Examiner* — Alicia Torres
*Assistant Examiner* — Adam J Behrens
(74) *Attorney, Agent, or Firm* — Peter K. Zacharias; Patrick M. Sheldrake

(57) ABSTRACT

A harvesting attachment for a harvester comprises a frame which includes a rear wall and a base wall. The base wall includes at its end a fastening region for fastening a harvesting unit.

16 Claims, 10 Drawing Sheets

(56) References Cited

U.S. PATENT DOCUMENTS

Figure 1:
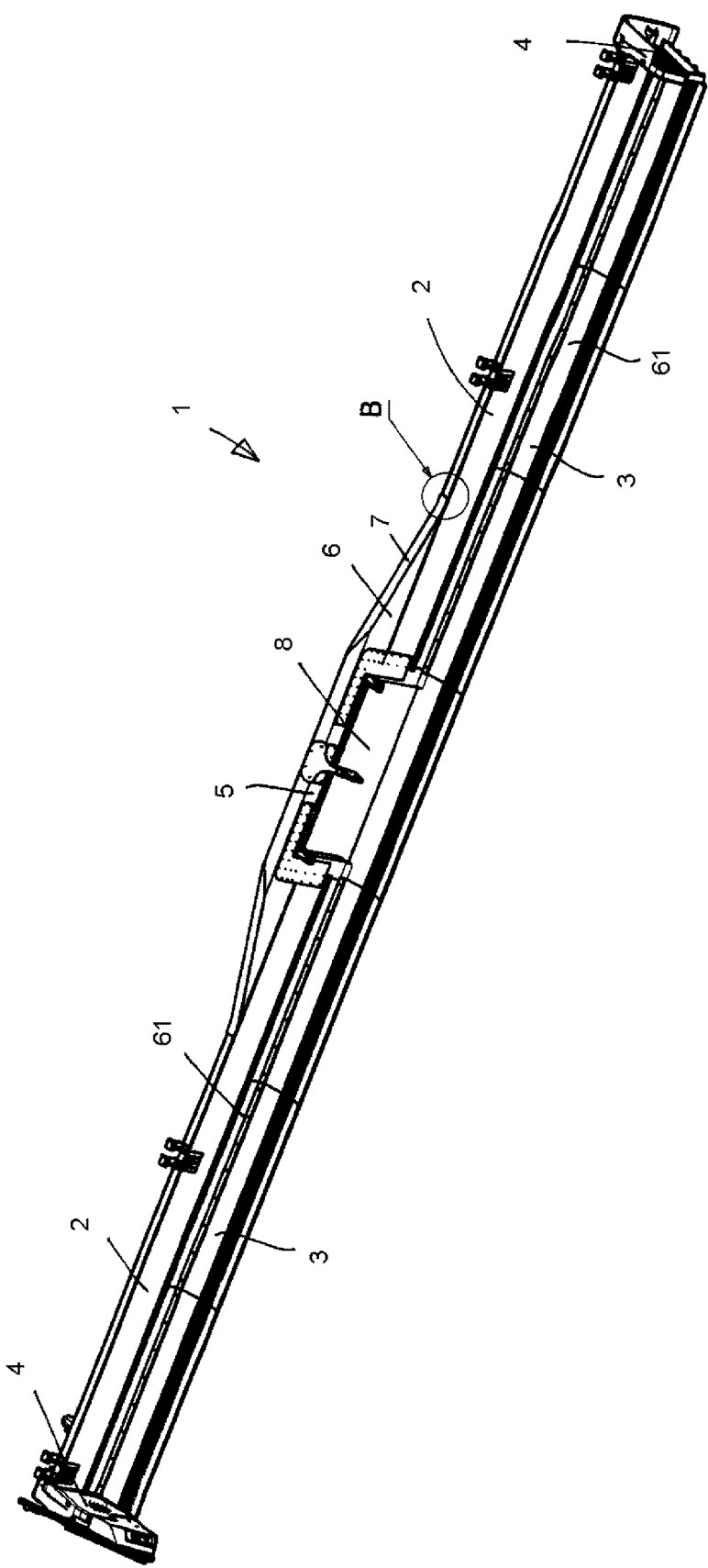

| | | | | |
|---|---|---|---|---|
| 3,451,199 A * | 6/1969 | Molzahn | A01D 61/008 | 56/1 |
| 3,451,530 A * | 6/1969 | Shumway | A01D 41/14 | 198/570 |
| 3,474,606 A * | 10/1969 | Oehler et al. | A01D 41/14 | 56/15.6 |
| 3,561,198 A * | 2/1971 | Herbsthofer | A01D 41/148 | 56/11.9 |
| 3,574,990 A * | 4/1971 | Calder | A01D 41/14 | 56/208 |
| 3,599,409 A * | 8/1971 | Whitney | A01D 45/021 | 56/105 |
| 3,623,299 A * | 11/1971 | Herbsthofer | A01D 41/148 | 56/2 |
| 3,812,661 A * | 5/1974 | Baker | A01D 41/147 | 56/128 |
| 3,981,125 A * | 9/1976 | Kerber | A01D 41/14 | 56/14.5 |
| 4,000,600 A * | 1/1977 | Butler | A01D 41/141 | 56/220 |
| 4,009,557 A * | 3/1977 | Reicks | A01D 45/22 | 56/14.3 |
| 4,037,393 A * | 7/1977 | Anderson | A01D 45/021 | 56/119 |
| 4,199,925 A * | 4/1980 | Quick | A01D 41/141 | 56/208 |
| 4,202,154 A * | 5/1980 | Waldrop | A01D 41/16 | 56/15.6 |
| 4,255,920 A * | 3/1981 | Janzen | A01D 45/003 | 56/126 |
| 4,266,392 A * | 5/1981 | Knepper | A01D 41/14 | 56/14.5 |
| 4,329,835 A * | 5/1982 | Pucher | A01D 45/021 | 56/119 |
| 4,407,110 A * | 10/1983 | McIlwain | A01D 41/14 | 56/14.4 |
| 4,445,314 A * | 5/1984 | Gust | A01D 41/147 | 56/119 |
| 4,487,004 A * | 12/1984 | Kejr | A01D 41/14 | 56/14.4 |
| 4,573,308 A * | 3/1986 | Ehrecke | A01D 41/14 | 56/14.4 |
| 4,589,250 A * | 5/1986 | Faul, Jr. | A01D 41/147 | 56/119 |
| 4,633,657 A * | 1/1987 | Arnold | A01D 45/02 | 56/119 |
| 4,660,360 A * | 4/1987 | Hardesty | A01D 41/14 | 56/15.8 |
| 4,677,814 A * | 7/1987 | Anderson | A01D 41/16 | 172/272 |
| 4,910,946 A * | 3/1990 | Underwood | A01D 41/148 | 56/14.4 |
| 4,961,681 A * | 10/1990 | Threatt | B66F 9/12 | 294/93 |
| 5,105,610 A * | 4/1992 | Britten | A01D 57/00 | 56/17.3 |
| 5,398,770 A * | 3/1995 | Harden | A01B 13/08 | 172/140 |
| 5,528,887 A * | 6/1996 | Nagy | A01D 41/147 | 56/109 |
| 5,671,595 A * | 9/1997 | Burmann | A01D 41/14 | 56/119 |
| 5,680,750 A * | 10/1997 | Stefl | A01D 45/021 | 56/119 |
| 5,806,292 A * | 9/1998 | Luecke | A01D 57/22 | 56/119 |
| 5,960,618 A * | 10/1999 | Kerber | A01D 45/021 | 56/119 |
| 6,029,429 A * | 2/2000 | Fox | A01D 41/14 | 56/10.2 E |
| 6,044,636 A * | 4/2000 | Minnaert | A01D 41/06 | 460/121 |
| 6,272,823 B1 * | 8/2001 | Yeomans | A01D 41/14 | 56/158 |
| 6,564,536 B1 * | 5/2003 | Hoffer | A01D 75/02 | 56/119 |
| 7,082,742 B2 | 8/2006 | Schrattenecker | | |
| 7,237,373 B2 | 7/2007 | Resing et al. | | |
| 7,395,651 B2 * | 7/2008 | Kost | A01D 45/021 | 56/119 |
| 7,520,117 B2 * | 4/2009 | Rieck | A01D 41/12 | 56/62 |
| 7,827,775 B2 * | 11/2010 | Sethi | A01D 57/20 | 56/314 |
| 8,061,114 B2 * | 11/2011 | Mossman | A01D 41/14 | 56/119 |
| 8,572,942 B2 * | 11/2013 | Dietrich | A01D 41/147 | 56/126 |
| 9,027,316 B2 * | 5/2015 | Dietrich | A01D 45/30 | 56/126 |
| 2005/0120694 A1 * | 6/2005 | Calmer | A01D 45/021 | 56/14.7 |
| 2007/0186532 A1 * | 8/2007 | Mossman | A01D 45/021 | 56/119 |
| 2010/0175356 A1 * | 7/2010 | Kalverkamp | A01D 45/021 | 56/103 |
| 2010/0326035 A1 * | 12/2010 | Schrattenecker | A01D 41/14 | 56/51 |

FOREIGN PATENT DOCUMENTS

| | | |
|---|---|---|
| DE | 3245372 C2 | 10/1986 |
| DE | 4428857 C1 | 2/1996 |
| DE | 102004008342 A1 | 10/2005 |
| WO | WO2008/104816 A1 | 9/2008 |
| WO | WO2012/072525 A1 | 6/2012 |

* cited by examiner

Section C-C

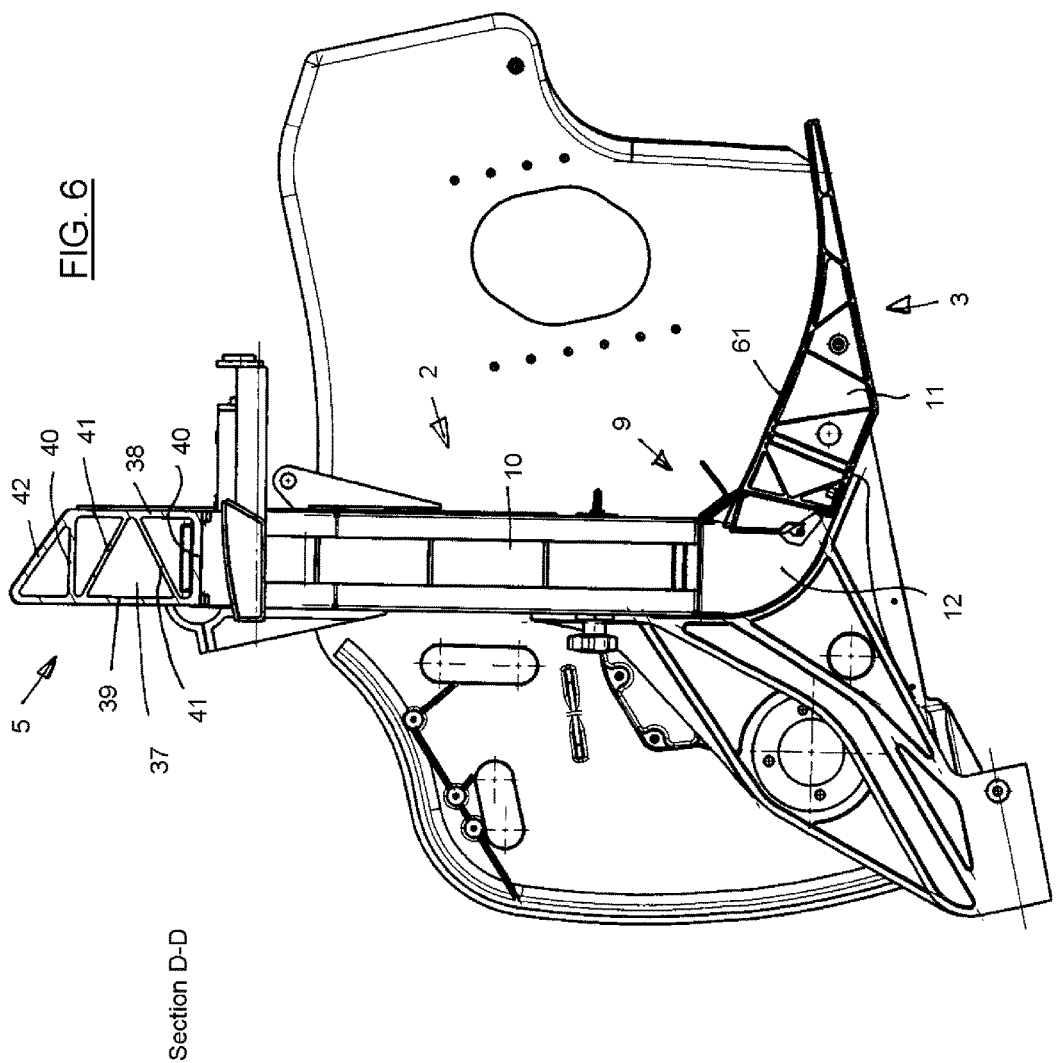

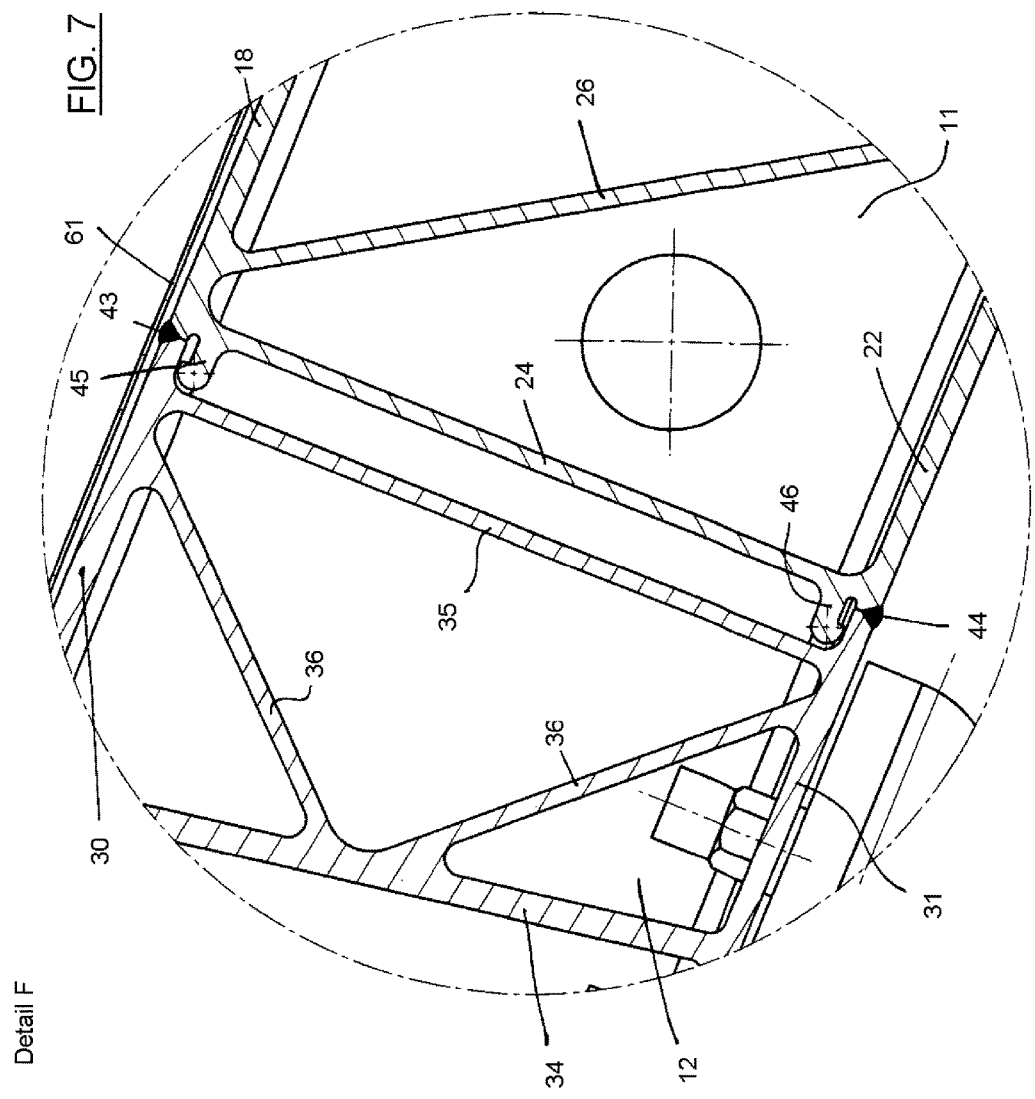

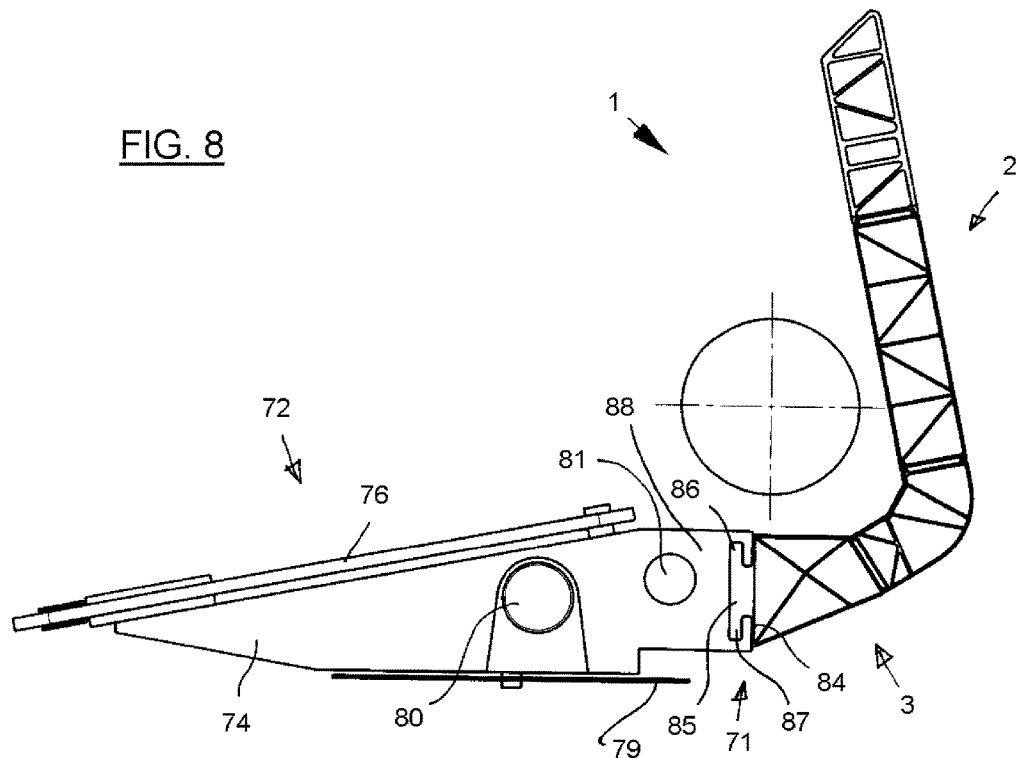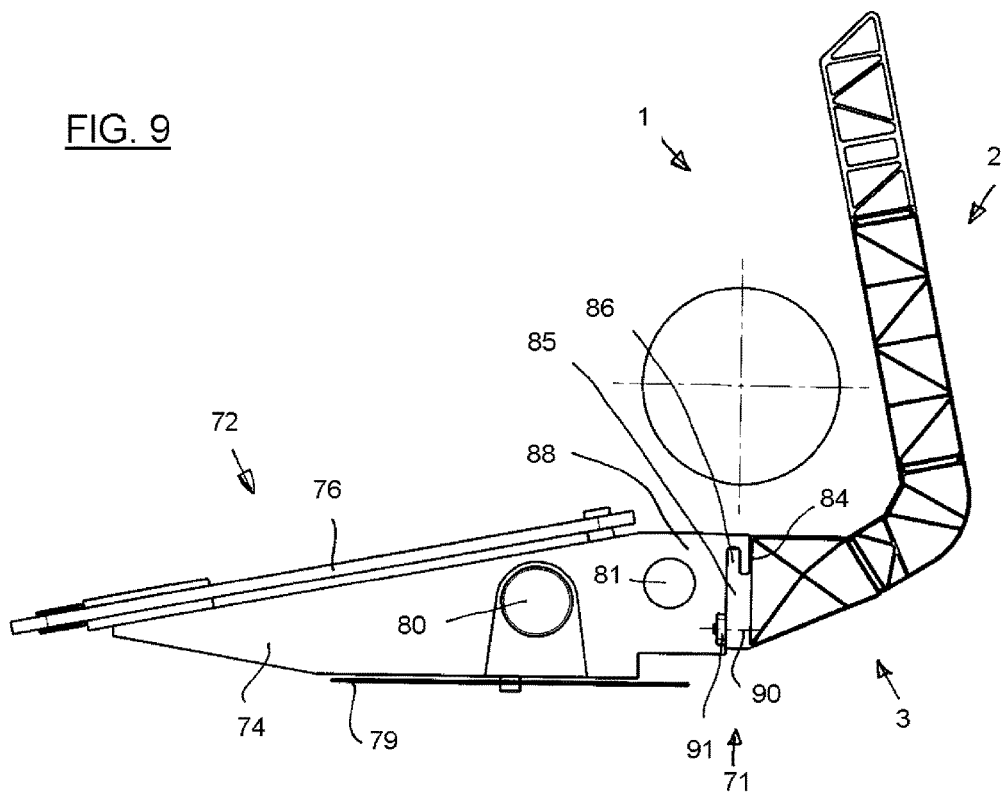

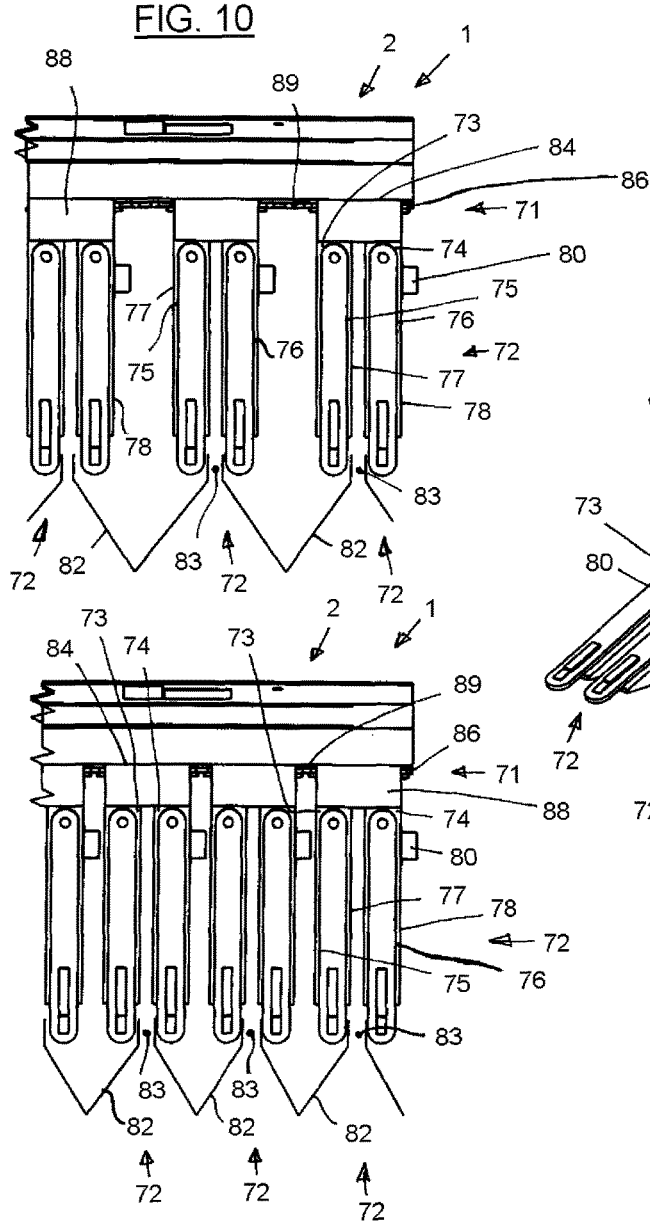
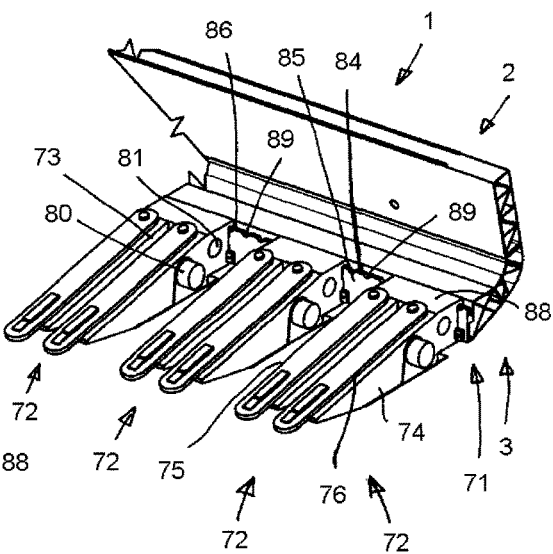

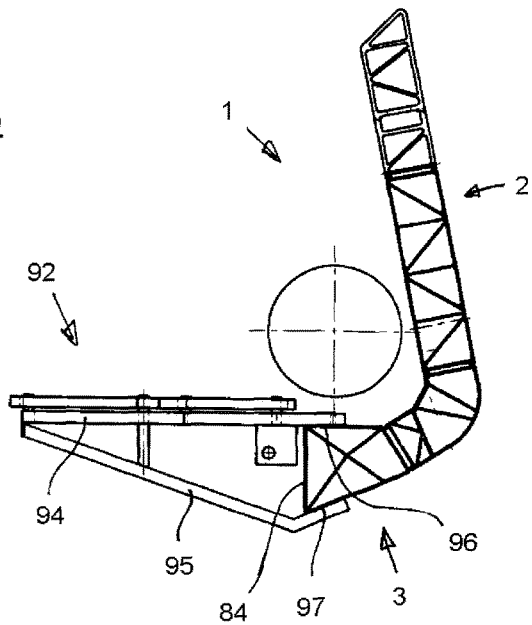
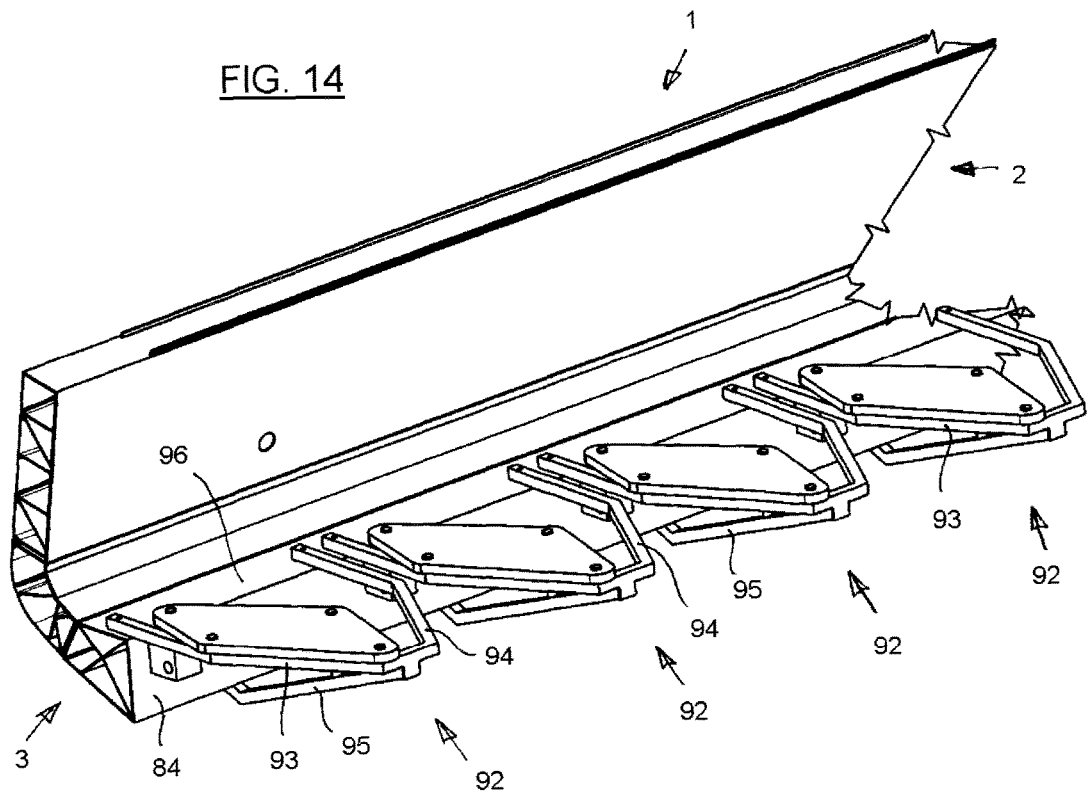

HARVESTING ATTACHMENT FOR A HARVESTER

This application is the US National Stage filing of International Application Serial No. PCT/EP2012/050519 filed on Jan. 13, 2012 which claims priority to German Application DE 10.2011.008.723.0 filed Jan. 17, 2011, each of which is incorporated herein by reference in its entirety.

The invention relates to a harvesting attachment for a harvester having a frame which includes a rear wall and a base wall. The harvesting attachment can furthermore have one or two side walls. The frame of the harvesting attachment can serve to receive different harvesting tools, in particular for receiving a cutting unit. The harvesting attachment can be fastened to a harvester, in particular to a combine harvester. It is moved in a forward direction over a field by means of an agricultural harvester during harvesting operation and serves to receive specific crops. The harvesting attachment, for example, includes a cutting unit, a reel, a cutting bar, a stalk cutter and/or diagonal cutter and/or further required components. The harvesting attachment is preferably mountable or mounted at the front side of a harvester, in particular of a combine harvester. It can include a corn adapter such as in particular used in a corn chopper.

It is currently generally very largely desired in the agricultural machine industry to provide ever wider harvesting attachments for self-propelled harvesting machines which enable a farmer to harvest a field in a shorter time and with fewer passages. The maximum working width of a harvesting attachment is, however, limited with respect to the stability of the construction due to increasing material load in dependence on the material quantity used. In this respect, axial moments of inertia of an area, for example, play an important role and are a measure for the resistance of the cross-section of the harvesting attachment to bending. Furthermore, engaging torsion forces have to be taken into account in the dimensioning of the harvesting attachment. Since a widening of the harvesting attachment is associated with a continuous increase in inherent weight, the forces, in particular the bending moment, which act on the harvesting attachment increase further.

A harvesting attachment for a combine harvester is known from DE 10 2004 008 342 A1 which includes a frame at which a cross-member extends horizontally and transversely to the forward direction.

A harvesting apparatus for harvesters is known from DE 32 45 372 C2 having a receiving platform which comprises a horizontally extending base, a rear wall and left and right side walls.

DE 44 28 857 C1 discloses a receiving table for harvesters which can be assembled within a predefined pattern in modular form for harvesters having different working widths to form a functional, compact assembly.

A cutting unit for a combine harvester is known from EP 1 453 372 B1 which has a frame which includes a rear wall, two side walls and a base which forms a trough and which serves as a cutting table. The base is composed of a rear base part fixed to the frame and of a front base part guided with sliding adjustability in the direction of travel relative to the frame for adapting the cutting table length to the respective harvesting conditions.

EP 2 266 382 A1 shows a harvesting attachment for a harvester having a frame which has an outer wall which forms a hollow space, with at least one brace being arranged in the hollow space. The frame has an L-shaped angular form. It can be made from aluminum by means of a metal casting process.

A harvesting attachment is known from DE 10 2010 052 816.1, which was applied for earlier, but was not prepublished, having a frame which has a rear wall and a base wall, with the frame being made as an extruded section.

DE 299 09 358 U1 discloses a picking attachment for a device for harvesting corn or other cereal, in particular for combine harvesters or forage harvesters. The picking attachment includes picking rollers which rotate in a driven manner about axes of rotation facing in the direction of travel of the device, which together or with a counter-holder each bound a passage gap for separating the infructescence from the plant stalk bearing it and have catching bars on their perimeter for catching the crop. The picking attachment further includes cutting blades for comminuting the plant stalks whose cutting edges have an arcuate extent.

It is the object of the invention to provide an improved harvesting attachment of the initially named type.

This object is achieved in accordance with the invention by the features of claim 1. The base wall includes at its end a fastening region for fastening one or more harvesting units. The rear wall of the harvesting attachment extends substantially in the vertical direction. The base wall of the harvesting attachment extends substantially in the horizontal direction. The fastening region is provided at the front end of the base wall. The front end of the base wall is in this respect the end which is remote from the rear wall of the harvesting attachment. The harvesting units which can be or are fastened to the harvesting attachment are in particular picking units, in particular corn picking units or picking units for other cereals, or sunflower harvesting units. It is advantageous if the harvesting units are substantially aligned with the base wall of the harvesting attachment. The harvesting units can be releasably or non-releasably fastenable or fastened to the base wall of the harvesting attachment. It is advantageous if the fastening region includes a substantially vertically extending end wall. Instead or additionally, the fastening region can include an upper end wall and/or a lower end wall. The upper end wall and/or the lower end wall can extend horizontally and/or obliquely.

Advantageous further developments are described in the dependent claims.

It is advantageous if the fastening region includes a guide for receiving the harvesting units. The guide can be formed as a guide bar. It is advantageous if the harvesting units are displaceably and lockably receivable or received at the guide. The displacement and/or adjustment and/or locking of the harvesting units at the guide can take place on the manufacture of the harvesting attachment, that is, in the manufacturing factory, and/or after delivery at the customer's site.

A further advantageous further development is characterized in that the fastening region, in particular the guide, has an upwardly facing projection. The upwardly facing projection is preferably spaced apart from the front end wall of the base wall.

It is advantageous if the fastening region, in particular the guide, has a downwardly facing projection. The downwardly facing projection is preferably spaced apart from the front end wall of the base wall.

In accordance with a further advantageous further embodiment, latching devices for the harvesting units are provided at the fastening region, in particular at the guide. The latching devices are preferably arranged at the upwardly facing projection of the fastening region or of the guide. The latching devices can be formed as latching recesses.

A further advantageous further development is characterized in that fastening devices for the harvesting units are provided at the fastening region, in particular at the guide. The fastening devices can be designed as threaded bolts. They can, however, also be formed as threaded bores. It is advantageous if complementary fastening devices are provided at the harvesting unit.

In accordance with a further advantageous further development, the harvesting units are formed as picking units, in particular as picking units for corn or similar plants. The picking unit can include move-in chains and/or picking plates and/or cutting apparatus.

It is advantageous if the frame is made as an extruded section.

Since the frame is manufactured in an extrusion process, this frame has a reduced inherent weight and/or increased strength. The harvesting attachment can therefore have a lower weight in comparison with previously known harvesting attachments with a specific working width. It is furthermore possible to manufacture a harvesting attachment having a larger working width.

It is advantageous if the frame is made as a light metal extruded section. A suitable light metal is in particular aluminum or a light metal containing aluminum.

A further advantageous further development is characterized by a curved connection wall between the rear wall and the base wall. The connection wall serves the connection of the rear wall to the base wall. It is advantageous if the rear wall is straight. The base wall is preferably likewise straight. It can, however, have curved sections, in particular a curved end section.

It is advantageous if the frame is composed of a plurality of extruded section parts. The extruded section parts are connected to one another. They can be releasably or non-releasably connected to one another. It is advantageous to provide the connection points at those points of the frame at which the load, in particular the bending load, is small, preferably at those points at which the load, in particular the bending load, is at a minimum. The connection points can in particular be provided at those points of the frame at which the finite element calculation of the load, in particular of the bending load, shows minima.

The extruded section parts are preferably welded to one another. The extruded section parts can instead or additionally also be adhesively bonded to one another.

A further advantageous further development is characterized in that the frame is composed of an extruded section rear wall, an extruded section base wall and a curved extruded section connection wall.

It is advantageous if the extruded section and/or the extruded section rear wall and/or the extruded section base wall and/or the extruded section connection wall have a front wall and a rear wall which are connected to one another by bracing walls. The front wall and the rear wall preferably extend parallel to one another.

It is advantageous if the bracing walls extend perpendicular to the front wall and/or to the rear wall.

Instead or additionally, the bracing walls can extend obliquely to the front wall and/or to the rear wall. This is in particular advantageous if bracing walls are also present which extend perpendicular to the front wall and/or to the rear wall. The bracing walls extending obliquely to the front wall and/or to the rear wall preferably extend in the form of a zig-zag line.

In accordance with a further advantageous further development, a cover sheet is attached to the front side of the frame. The cover sheet is in particular attached to the front wall of the extruded section. It can act as a protective sheet for the extruded section. The cover sheet is preferably manufactured from steel or from stainless steel. It can, however, also be manufactured from another wear-resistant material.

It is advantageous if the cover sheet is galvanically separated from the extruded section. This is in particular advantageous when the extruded section comprises aluminum or a material which contains aluminum and when the cover sheet is made from steel or stainless steel or from another material which contains iron. In this case, the extruded section could corrode due to the contact with the protective sheet. The steel sheet can be powder coated at least on the side facing the extruded section for the galvanic separation and/or for corrosion protection. It is, however, also possible to provide the cover sheet with a paint layer, in particular by wet painting, at least on the side facing the extruded section. Instead of these measures, an adhesive can also be applied between the extruded section and the cover sheet. This is in particular advantageous when the cover sheet is fastened to the extruded section by adhesive bonding.

Figure 2:
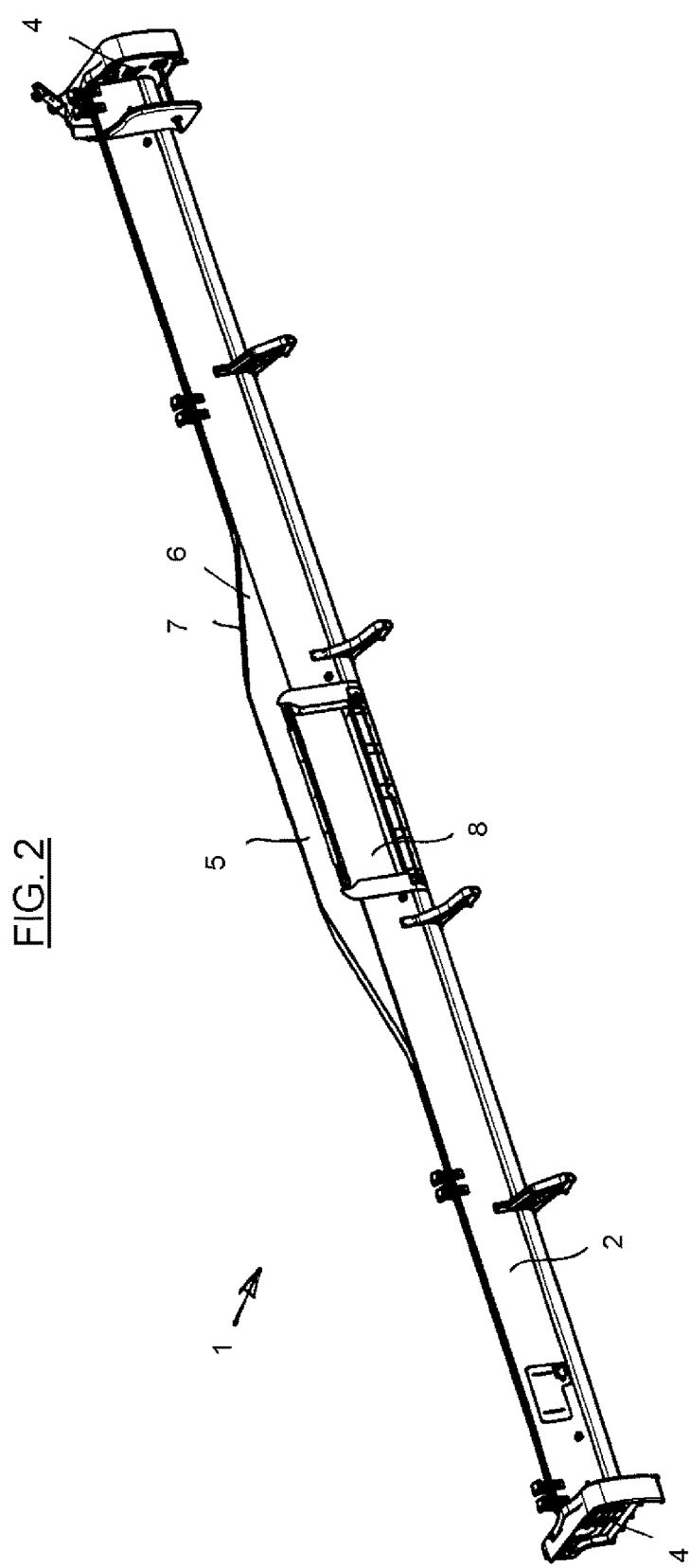
Figure 3:
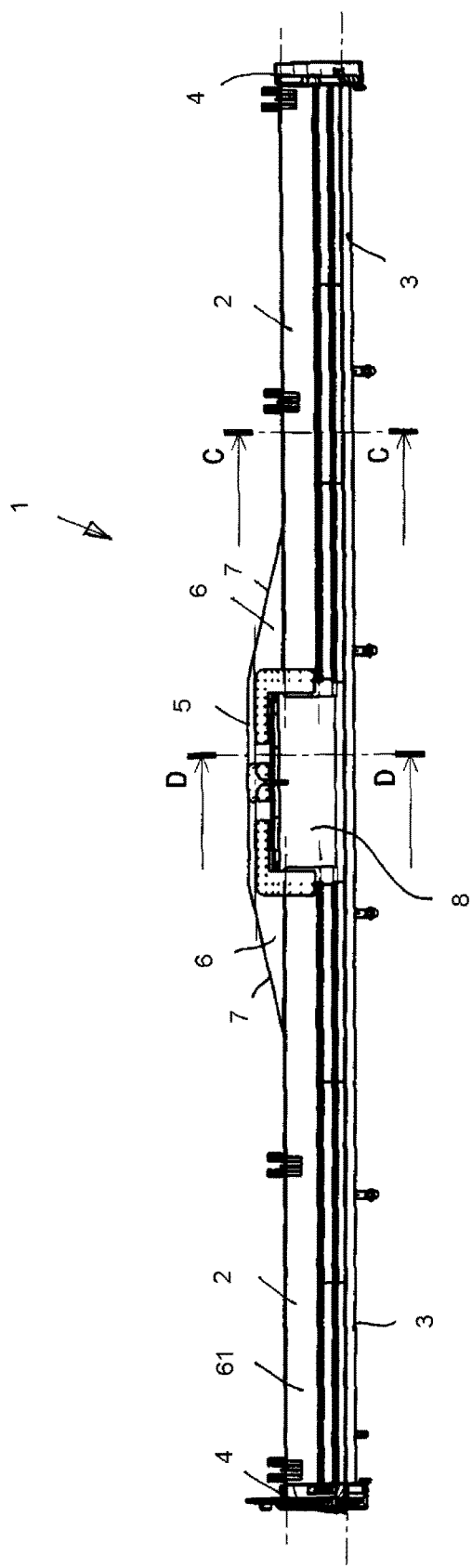
Figure 4:
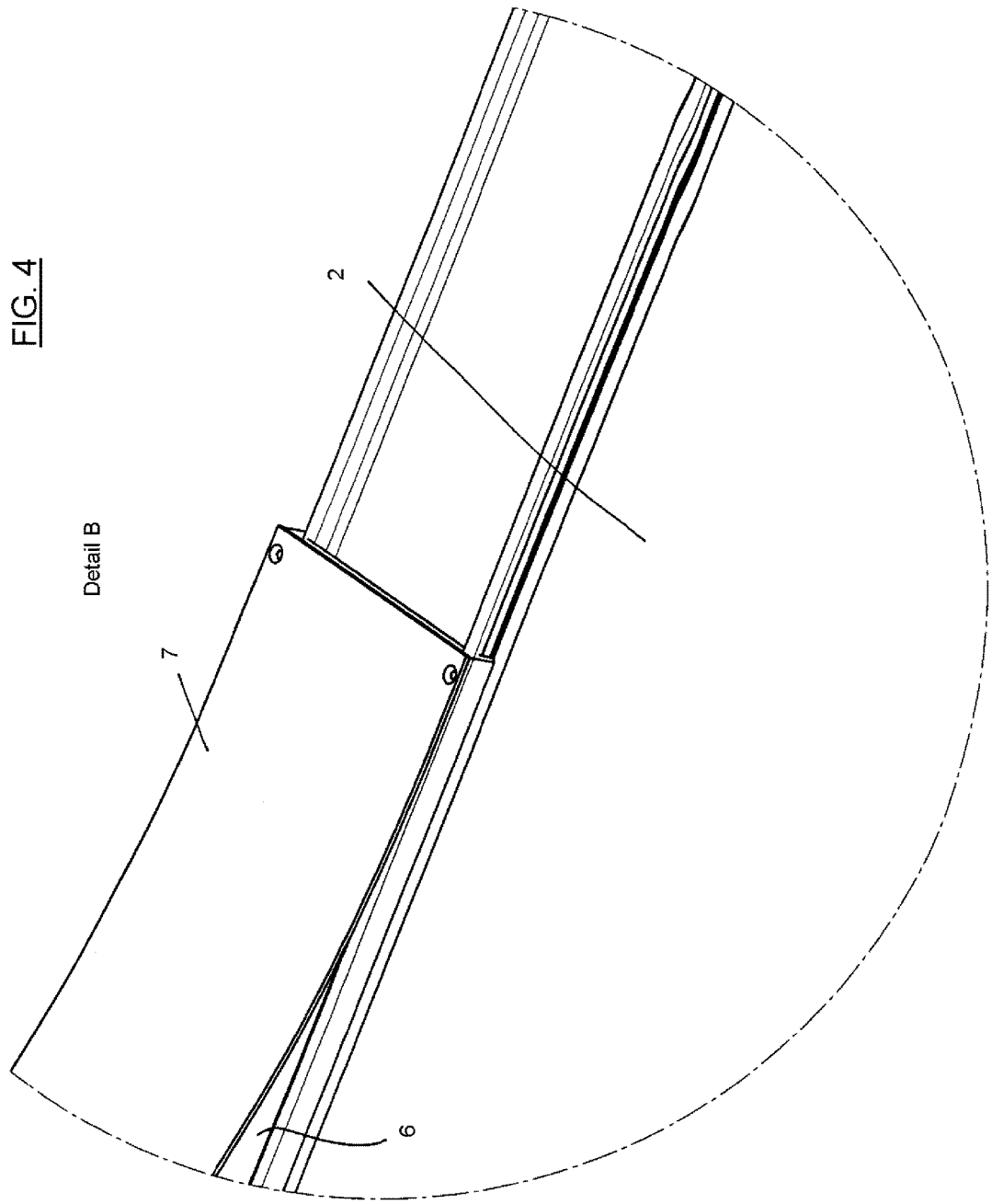
Figure 5:
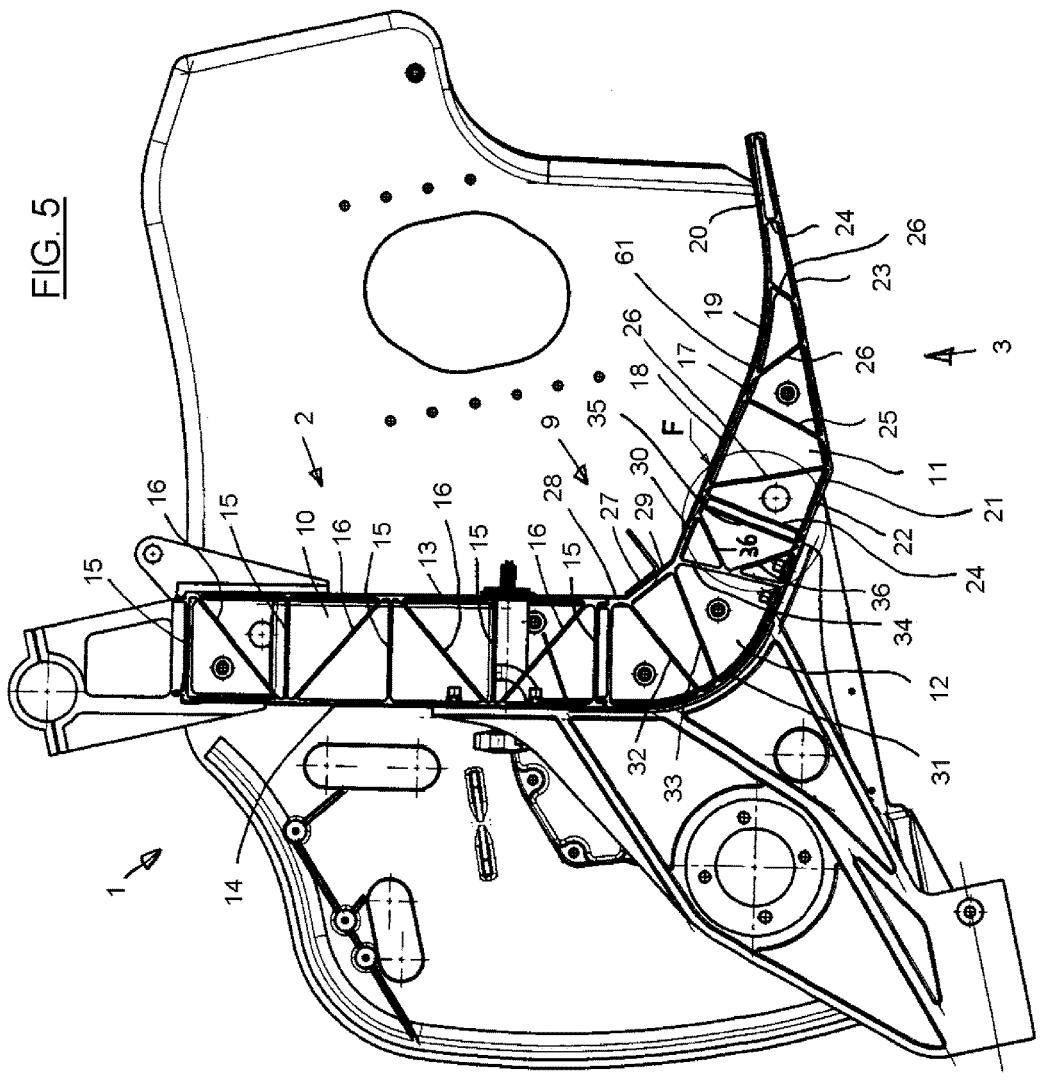

Embodiments of the invention will be explained in detail in the following with reference to the enclosed drawing. There are shown in the drawing FIG. 1 a harvesting attachment in a perspective view from the front, FIG. 2 the harvesting attachment in accordance with FIG. 1 in a perspective view from the rear;

FIG. 3 the harvesting attachment in accordance with FIGS. 1 and 2 in a view from the front;

FIG. 4 the detail B from FIG. 1 in an enlarged view;

FIG. 5 a section along the line C-C in FIG. 3;

FIG. 6 a section along the line D-D in FIG. 3;

FIG. 7 the detail F from FIG. 5 in an enlarged view;

FIG. 8 a harvesting attachment having corn picking units in a lateral sectional view;

FIG. 9 a modification of the embodiment of FIG. 8, likewise in a lateral sectional view;

FIG. 10 the harvesting attachment and the corn picking units in accordance with FIGS. 8 and 9 in a view from above;

FIG. 11 the subject of FIG. 10 in a perspective view;

FIG. 12 the corn picking units in accordance with FIGS. 8 to 11, with the corn picking units having a smaller distance from one another;

FIG. 13 a harvesting attachment having a sunflower harvesting unit in a lateral sectional view; and FIG. 14 the subject of FIG. 13 in a perspective view.

The harvesting attachment shown in FIG. 1 for a harvester, in particular for a combine harvester, includes a frame 1 which has a rear wall 2 and a base wall 3. The frame 1 has an L-shaped angular form. The rear wall 2 extends substantially in the vertical direction and the base wall 3 extends substantially in the horizontal direction.

The longitudinal extent of the frame 1 corresponds to the working width. The frame 1 has side walls 4 at its ends.

The rear wall 2 is provided with an elevated portion 5 at the center of the frame 1. The elevated portion 5 extends as a prolongation of the rear wall 2. It has lateral chamfers 6. The lateral chamfers 6 are covered by the cover sheet 7, as can also be seen from FIG. 4.

A passage opening 8 is furthermore provided at the center of the rear wall 2 and is bounded on both sides by the side walls 2 and by the base wall 3 and the elevated portion 5. The passage opening 8 can serve the mounting of the frame 1 to the harvesting vehicle. The harvest can furthermore be conveyed through the passage opening 3 from the front side of the frame 1 of the harvesting vehicle. An auger (not shown in the drawing) can be present in the frame 1 to convey the harvest.

FIG. 2 shows the frame 1 in a perspective representation. The frame 1 is shown in a view from the front in FIG. 3.

The frame 1 is formed as an extruded section as can in particular be seen from FIGS. 5 and 6. It is a light metal extruded section of aluminum or of a material containing aluminum. A curved connection wall 9 is present between the rear wall 2 and the base wall 3. The rear wall 2 and the base wall 3 are connected to one another by the connection wall 9.

The frame 1 is composed of a plurality of extruded section parts. In this respect, these are an extruded section rear wall 10, an extruded section base wall 11 and a curved extruded section connection wall 12 which are connected to one another, namely welded to one another.

The extruded section rear wall 10 has a front wall 13 and a back wall 14. The front wall 13 and the back wall 14 extend parallel to one another. They are connected to one another by bracing walls 15 which extend perpendicular to the front wall 13 and to the back wall 14. The bracing walls 15 are spaced apart from one another, with the spacing of adjacent bracing walls 15 each being of equal size.

The front wall 13 and the back wall 14 are furthermore connected to one another by bracing walls 16 which extend obliquely to the front wall 13 and obliquely to the back wall 14. An obliquely extending bracing wall 16 is in every case present between two adjacent bracing walls 15 and in each case extends diagonally through this field. The obliquely extending bracing walls 16 extend in a zig-zag line.

The extruded section base wall 11 is designed in a similar manner. It has a front wall 17 sand a back wall 21. The front wall 17 has a straight section 18 on the side facing the connection wall 12, said straight section merging in the direction away from the connection wall 12 into a curved section 19 and into a further straight end section 20 adjoining it. The back wall 21 has on the side facing the connection wall 12 a straight section 22 which extends parallel to the straight section 18 of the front wall 17. A straight end section 23 adjoins the straight section 22 of the back wall 21 and extends at an angle thereto; its end is connected to the end of the straight end section 20 of the front wall 17.

The front wall 17 and the back wall 21 are connected to one another by bracing walls 24, 25 which extend perpendicular to the straight sections 18, 20 of the front wall 17. The outer bracing walls 24 also extend perpendicular to the straight sections 22, 23 of the back wall 21. The middle bracing wall 25 extends at an angle to the straight end section 23.

The front wall 17 and the back wall 21 are furthermore connected to one another by further bracing walls 26 which extend obliquely to the front wall 17 and obliquely to the back wall 21.

The connection wall 12 has a front wall 27 which comprises three straight sections which each extend at an angle to one another. The first straight section 28 is aligned with the front wall 13 of the rear wall 10; the third straight section 30 is aligned with the straight section 18 of the base wall 11. The second straight section 29 connects the first straight section 28 to the third straight section 30.

The back wall 31 of the connection wall 12 has the shape of a segment of a circle. It adjoins the back wall 14 of the rear wall 10 and the back wall 22 of the base wall 11 tangentially in each case.

The connection wall 12 has a first bracing wall 32 which extends from the connection point of the straight sections 28, 29 of the front wall 27 to the center of the curved back wall 31. It furthermore has a second bracing wall 33 which extends from the connection point of the straight sections 29, 30 of the front wall 27 to the center of the curved back wall 31. The connection wall 12 furthermore has a further bracing wall 34 which extends from the connection point of the straight sections 29, 30 of the front wall 27 to the back wall 31 and a further bracing wall 35 which extends from the end of the straight section 30 facing the base wall 11 to the end of the back wall 31 likewise facing the base wall 11. The bracing walls 34, 35 extend perpendicular to the straight section 30 and perpendicular to the back wall 31. Further bracing walls 36 are arranged in the field bounded by the bracing walls 34, 35. The bracing walls 36 extend obliquely to the straight section 30 and obliquely to the back wall 31. They are furthermore arranged in a V shape, with the tip of the V being at the center of the bracing wall 34.

The extruded section 37 of the elevated portion 5 is designed in a similar manner to the extruded section rear wall 10, as can be seen from FIG. 6. It has a front wall 38, a rear wall 39, bracing walls 40 which extend perpendicular to the front wall 38 and to back rear wall 39, and bracing walls 41 which extend obliquely to the front wall 38 and to the back wall 39. The upper end wall 42 of the extruded section 37 extends obliquely to the front wall 38 and obliquely to the back wall 39, with the slope facing the side of the base wall 11.

FIG. 7 shows the weld connection between the connection wall 12 and the base wall 11. The straight section 30 and the back wall 31 project beyond the bracing wall 35. They are aligned with the straight section 18 and with the straight section 22. The straight section 30 and the straight section 18 are positioned abutting one another. The weld seam 43 is located at the abutment point. It connects the straight section 30 to the straight section 18.

In a corresponding manner, the back wall 31 and the straight section 22 are positioned abutting one another. The weld seam 44 is located at the abutment point. It connects the back wall 31 and the straight section 22.

The bracing wall 24 connects the ends of the straight section 18, 22. Positioning sections 45, 46 extend from the bracing wall 24 toward the connection wall 12. They have support heads at their ends which abut at the inner sides of the straight section 30 and of the back wall 31. The end of the base wall 11 can in this manner be plugged into the end of the connection wall 12 facing said end of the base wall until the straight sections 30, 18 and the back wall 31 and the straight section 22 each contact one another in an abutting manner. This assembly movement is led through the heads of the positioning sections 45, 46. The weld seams 43, 44 can then be applied.

A cover sheet 61 is attached to the front side of the frame 1. The cover sheet 61 is galvanically separated from the extruded section 10, 11, 12.

The extruded sections 10, 11, 12 extend over the total working width, that is over the total length of the frame 1.

FIG. 8 shows a modification in accordance with the invention of the harvesting attachment in accordance with FIGS. 1 to 7. The rear wall 2 of the frame 1 in accordance with FIG. 8 corresponds to that of the embodiment in accordance with FIGS. 1 to 7. The base wall 3 of the embodiment in accordance with FIG. 8 has, unlike the embodiment in accordance with FIGS. 1 to 7, a fastening region 71 to which a plurality of harvesting units, namely corn picking units 72, are fastened. The corn picking unit 72 includes a left hand housing 73 and a right hand housing 74, a left hand move-in chain 75 and a right hand move-in chain 76, a left hand picking plate 77 and a right hand picking plate 78 as well as a cutting apparatus 79 which includes blades rotating about a vertical axis. The corn picking unit 72 furthermore includes a drive shaft 80 for the cutting apparatus 79 and a drive shaft 81 for the move-in chains 75, 76. The corn picking unit 72 is generally of an already known type of construction.

The harvesting attachment is shown with three corn picking units 72 in FIGS. 10 and 11. Further corn picking units adjoin at both sides in the longitudinal direction of the frame 1.

A divider tip 82 is respectively associated with two adjacent corn picking units 72, as shown in FIG. 10. The divider tips 82 are designed as guide plates. They guide the cut product to the respective inflow gap 83 between two revolving move-in chains 75, 76 of a corn picking unit 72.

The fastening region 71 includes a front end wall 84 of the base wall 3. The front end wall 84 extends in the vertical direction.

A guide bar 85 is attached to the front end wall 84. The guide bar 85 serves for receiving the corn picking units 72. It includes an upwardly facing projection 86 and a downwardly facing projection 87. The projections 86, 87 are spaced apart from the front end wall 84. The guide bar 85 in this manner forms a dovetail guide. A connection housing 88 of the corn picking unit 72 is displaceably and releasably fastened to the guide bar 85. The left hand housing 73 and the right hand housing 74 of the corn picking unit 72 are fastened to the connection housing 88. The connection housing 88 can be displaced along the guide bar 85 in the longitudinal direction of the frame 1 of the harvesting attachment. It can be locked and/or fastened at a suitable point. Latching devices which are formed as latching recesses 89 are provided for this purpose at the guide bar 85, namely at its upwardly facing projection 86. Corresponding elevated latching portions which are provided at the connection housing 88 (not shown in the drawing) engage into the latching recesses 89.

An embodiment is shown in FIG. 10 in which the spacing between two adjacent corn picking units 72 is substantially of exactly the same size as the width of the corn picking unit 72. If work should be carried out with a larger number of corn picking units 72, the corn picking units 72 can be displaced toward one another along the guide bar 85 until, for example, the embodiment shown in FIG. 12 is reached in which the spacing of adjacent corn picking units 72 is approximately as large as the width of a picking plate 77, 78. The divider tips 82 now have a correspondingly smaller width.

In the embodiment in accordance with FIG. 9, the guide bar 85 only has an upwardly facing projection 86, but not a downwardly facing projection 87. The corn picking units 72 are fastened by fastening devices to the front end wall 84 and/or to the guide bar 85. The fastening devices can be formed as threaded bolts 90 and threaded nuts 91.

In the embodiment in accordance with FIG. 8, the corn picking units 72 have to be laterally pushed onto the guide bar 85. In the embodiment in accordance with FIG. 9, it is possible to hang the corn picking units 72 into the guide bar 85 from above.

FIGS. 13 and 14 show a harvesting attachment in which sunflower harvesting units 92 are fastened to the base wall 3 instead of the corn picking units. The sunflower harvesting units 92 each include a frame with a left hand horizontal strut 93, a right hand horizontal strut 94 and a lower strut 95.

The fastening region 71 includes an upper end wall 96 and a lower end wall 97. The end walls 96, 97 adjoin the front end wall 84. The upper horizontal struts 93, 94 are fastened to the upper end wall 96 which extends horizontally. The lower strut 95 is fastened to the lower end wall 97 which extends at an inclination.

The invention claimed is:

1. A harvesting attachment having a frame, comprising:
   a rear wall; and
   a base wall attached to the rear wall by a curved connection wall, the base wall comprising a fastening region for fastening a harvesting unit, the fastening region comprising:
   a front end wall extending in a vertical direction; and
   a guide attached to and extending from the front end wall, the guide comprising a guide bar comprising an upper surface and a lower surface, the guide further comprising a fixed upwardly-facing projection disposed on the upper surface of the guide bar and a fixed downwardly-facing projection disposed on the lower surface of the guide bar; and
   latching devices for releasable attachment of the harvesting unit.

2. The harvesting attachment according to claim 1, wherein the latching devices for the harvesting unit are provided at the guide.

3. The harvesting attachment according to claim 1, wherein the harvesting unit is formed as a picking unit.

4. The harvesting attachment according to claim 1, wherein the frame is formed as an extruded section formed from aluminum or a material containing aluminum.

5. The harvesting attachment according to claim 1, wherein the curved connection wall is a curved extruded section connection wall connecting the rear wall to the base wall by one of a weld and an adhesive bond, wherein the rear wall is formed as an extrusion and the base wall is formed as an extrusion.

6. The harvesting attachment according to claim 5, wherein at least one of the extruded section connection wall, the rear wall, and the base wall has a front wall and a back wall connected to one another by bracing walls,
   wherein the bracing walls extend to at least one of perpendicular and oblique to at least one of the front wall and the back wall.

7. The harvesting attachment according to claim 5, wherein a cover sheet is attached to the front side of the frame, wherein the cover sheet is galvanically separated from the extruded section parts.

8. The harvesting attachment according to claim 1, in combination with the harvesting unit wherein the harvesting unit is fastened to the base wall of the harvesting attachment.

9. The harvesting attachment according to claim 1, wherein the latching devices include latching recesses provided in the guide.

10. A header for an agricultural harvester, the header comprising:
    a frame comprising a rear wall and a base wall, the base wall comprising a front end wall extending in a vertical direction;
    a fastening region disposed on the front end wall, the fastening region comprising:

a guide bar attached to and extending from the front end wall;

a first fixed projection extending upwardly from a top surface of the guide bar; and a second fixed projection extending downwardly from a bottom surface of the guide bar;

a plurality of crop harvesting attachments mounted to the fastening region; and one or more latching devices disposed on the guide bar between adjacent ones of the plurality of crop harvesting attachments.

11. A header for an agricultural harvester, the header comprising:

a frame comprising a rear wall and a base wall, the base wall comprising a front end wall extending in a vertical direction, the frame further comprising a curved extruded section connection wall connecting the rear wall to the base wall, wherein the rear wall is formed as an extrusion and the base wall is formed as an extrusion;

a fastening region disposed on the front end wall, the fastening region comprising:

a guide bar attached to and extending from the front end wall;

a first fixed projection extending upwardly from a top surface of the guide bar; and a second fixed projection extending downwardly from a bottom surface of the guide bar; and one or more crop harvesting attachments mounted to the fastening region.

12. The header of claim 11, wherein the rear wall is welded to the connection wall, and the base wall is welded to the connection wall.

13. The header of claim 11, wherein each of the rear wall, the connection wall, and the base wall comprise first and second walls connected to one another by bracing walls.

14. The header of claim 13, wherein the bracing walls comprise a plurality of bracing walls which are perpendicular to the first and second walls of each of the rear wall, the connection wall, and the base wall.

15. The header of claim 14, wherein the bracing walls further comprise a plurality of bracing walls which are oblique to the first and second walls of each of the rear wall, the connection wall, and the base wall.

16. The header of claim 15, wherein the oblique bracing walls of each of the rear wall, the connection wall, and the base wall extend in a zig-zag line.

* * * * *